United States Patent [19]

Masse

[11] Patent Number: 5,741,856
[45] Date of Patent: Apr. 21, 1998

[54] CHEMICAL CURING OF EXPOXIDIZED DIENE POLYMERS USING AROMATIC ANHYDRIDE CURING AGENTS

[75] Inventor: Michael Alan Masse, Richmond, Tex.

[73] Assignee: Shell Oil Company, Houston, Tex.

[21] Appl. No.: 797,155

[22] Filed: Feb. 10, 1997

Related U.S. Application Data

[60] Provisional application No. 60/011,670, Feb. 14, 1996.
[51] Int. Cl.$^6$ ............................................. C08L 53/00
[52] U.S. Cl. ............... 525/92 B; 525/92 F; 525/92 H; 525/533; 525/941; 525/942; 528/112
[58] Field of Search ............... 525/92 B, 92 F, 525/92 H, 533, 941, 942; 528/112

[56] References Cited

U.S. PATENT DOCUMENTS

| | | | |
|---|---|---|---|
| 2,829,130 | 1/1958 | Greenspan et al. | 260/82.1 |
| 2,829,135 | 1/1958 | Greenspan et al. | 260/94.7 |
| 5,229,464 | 7/1993 | Erickson et al. | 525/314 |
| 5,332,783 | 7/1994 | Dillman et al. | 525/98 |
| 5,420,202 | 5/1995 | St. Clair et al. | 525/95 |
| 5,428,114 | 6/1995 | Erickson et al. | 525/94 |
| 5,461,112 | 10/1995 | Masse et al. | 525/92 B |
| 5,478,885 | 12/1995 | Masse et al. | 525/92 B |

FOREIGN PATENT DOCUMENTS

95/28431  10/1995  WIPO.

OTHER PUBLICATIONS

Search Report dated May 23 1997.

*Primary Examiner*—Randy Gulakowski
*Attorney, Agent, or Firm*—Donald E. Haas

[57] ABSTRACT

A process for curing epoxidized diene polymers for use in adhesives, sealants, and coatings which comprises contacting the polymer with an aromatic anhydride curing agent at an epoxy/anhydride molar ratio from 0.5/1 to 2.0/1.0, optionally, and from 0.1 to 10 phr of an accelerator at a temperature of from 100° to 200° C. for a period of 10 minutes to six hours.

6 Claims, No Drawings

CHEMICAL CURING OF EXPOXIDIZED DIENE POLYMERS USING AROMATIC ANHYDRIDE CURING AGENTS

CROSSREFERENCE TO RELATED APPLICATIONS

This application claims the benefit of U.S. Provisional Application No. 60/011,670, filed Feb. 14, 1996.

FIELD OF THE INVENTION

This invention relates to the chemical curing of epoxidized diene polymers which are used in sealant, coatings, and adhesives applications. More particularly, the present invention relates to specific aromatic anhydride curing agents which provide a high level of crosslinking and enhanced mechanical properties in the cured polymer.

BACKGROUND OF THE INVENTION

The chemical curing of epoxidized diene polymers is of interest for sealant, coatings, and adhesives applications. U.S. Pat. No. 5,229,464 describes low molecular weight epoxidized diene block copolymers and states that they may be crosslinked by the addition of multifunctional carboxylic acids and acid anhydrides. U.S. Pat. Nos. 5,478,885 and 5,461,112 describe similar polymers which are used as toughening modifiers for epoxy resins. These epoxidized diene polymers are shown to be curable with carboxylic acid or anhydride curing agents. In this latter application, partially and fully saturated aliphatic carboxylic acids or anhydrides have been found to be very useful and to allow the production of very good products. However, a number of problems have been encountered when the same partially or fully saturated aliphatic carboxylic acids or anhydrides have been used as curing agents to cure the epoxidized diene polymers when epoxy resins are not present in the compositions to be cured. Such is the case when these polymers are used in sealant, coatings, and adhesive applications.

I have discovered that when such carboxylic acid anhydrides are used to cure these epoxidized diene polymers alone, bubbles form in the crosslinked product. Relatively low conversion levels are achieved with these curing agents and the products exhibit low strength because of both a low level of crosslinking conversion of the epoxy and defects introduced into the product as bubbles.

It has been found that the bubbles are produced as a result of the evolution of carbon dioxide during the decarboxylation of the anhydride. This side reaction competes with the desired crosslinking reaction and the kinetics are such that it takes up enough of the epoxy groups to significantly lessen the total curing while producing $CO_2$ bubbles in the product. This problem does not occur to any noticeable extent in the epoxy resin impact modification as described in U.S. Pat. Nos. 5,478,885 and 5,461,112 above because the reaction of the anhydride with the epoxy resin is much faster than the reaction between the epoxidized diene polymer and the anhydride and also because in that patent, the majority of the composition is the epoxy resin.

It is clear from the above that when there is a desire for a high strength, defect free sealant, coating, or adhesive utilizing an epoxidized diene polymer, a curing agent different from the partially and fully saturated aliphatic carboxylic acid anhydrides is needed. There are other types of curing agents which can be used, but acid anhydride curing agents are preferable in the curing of epoxidized diene polymers because amines will not rapidly cure such polymers without an epoxy resin present. The Applicant here has found that certain aromatic acid anhydride curing agents are capable of curing epoxidized diene polymers to a high degree of cure and high strength without the formation of bubbles.

SUMMARY OF THE INVENTION

This invention is a method for chemically curing epoxidized diene polymers for use in sealants, coatings, and adhesives applications. The method involves curing said epoxidized diene polymers with aromatic carboxylic acid anhydrides. The curing process generally takes place at elevated temperatures, 100° to 200° C., for a period of 30 minutes to 6 hours and is often referred to as "bake cure." The preferred aromatic carboxylic acid anhydride curing agents for use in the present invention are phthalic anhydride and 4-methyl-phthalic anhydride. The anhydride bake cures can be accelerated by using a curing accelerator.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, preferably lithium, their alkyls, amides, silanolates, napthalides, biphenyls or anthracenyl derivatives. The polydienes are synthesized by anionic polymerization of conjugated diene hydrocarbons with these lithium initiators. This process is well known as described in U.S. Pat. Nos. 4,039,593 and Re. 27,145 which descriptions are incorporated herein by reference. Polymerization commences with a monolithium initiator which builds a living polymer backbone at each lithium site. Specific processes for making the preferred polymers for use herein are described in detail in copending, commonly assigned application Ser. No. 08/320,807 filed Oct. 11, 1994, entitled "Monohydroxylated Diene Polymers and Epoxidized Derivatives Thereof" and U.S. Pat. No. 5,461,112 which are herein incorporated by reference.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

Epoxidized polymers which may be cured in accordance with the present invention are those described in U.S. Pat. Nos. 5,229,464, 5,247,026, 5,478,885, and 5,461,112, which are all herein incorporated by reference. For instance, the following block copolymers containing from 0.1 to 7.0 milliequivalents (meq) of epoxy per gram of polymer may be used:

$(A-B-A_p)_n-Y_r-(A_q-B)_m$
wherein Y is a coupling agent, coupling monomers or an initiator, and wherein A and B are polymer blocks which may be homopolymer blocks of conjugated diolefin monomers, copolymer blocks of conjugated diolefin monomers or copolymer blocks of conjugated diolefin monomers and monoalkenyl aromatic hydrocarbon monomers, and wherein the A blocks have a greater number of di-, tri- and tetra-substituted unsaturation sites per unit of block mass than do the B blocks, and wherein the A blocks have a weight average molecular weight from about 100 to about 3000 and the B blocks have a weight average molecular weight from about 1000 to about 15,000, and wherein p and q are 0 or 1 and n>0, r is 0 or 1, m≧0 and n+m ranges from 1 to 100.

The most highly preferred polymers for use herein are epoxidized diblock polymers which fall within the scope of the formula:

$(HO)_x-A-S_z-B-(OH)_y$ wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a weight average molecular weight of from 100 to 6000, preferably 500 to 4,000, and most preferably 1000 to 3000, and the B blocks have a weight average molecular weight of from 1000 to 15,000, preferably 2000 to 10,000, and most preferably 3000 to 6000. S is a vinyl aromatic hydrocarbon block which may have a weight average molecular weight of from 100 to 10,000. x and y are 0 or 1. Either x or y must be 1, but only one at a time can be 1. z is 0 or 1.

The overall weight average molecular weight of such diblocks may range from 1500 to 15000, preferably 3000 to 7000. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

I-B-OH  I-B/S-OH  I/S-B-OH  I-I/B-OH  or
B/I-B/S-OH  B-B/S-OH  I-EB-OH  I-EB/S-OH  or
I-S/EB-OH  I/S-EB-OH  HO-I-S/B  HO-I-S/EB where EB is hydrogenated butadiene, -EB/S-OH means that the hydroxyl source is attached to a styrene mer, and -S/EB-OH signifies that the hydroxyl source is attached to a hydrogenated butadiene mer. This latter case, -S/EB-OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight acid such as formic acid. These and other methods are described in more detail in U.S. Pat. Nos. 5,229,464, 5,247,026, 5,478,885, and 5,461,112, which are herein incorporated by reference. The epoxidized polymers of this invention may contain from 0.1 to 7.0 meq of epoxy per gram of polymer depending upon the desired end use for the product.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average, but for monodisperse polymers, all three are very similar. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the absolute molecular weight of a polymer is not as straightforward or as easy to make using GPC. A good method to use for absolute molecular weight determination is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

If desired, these block copolymers can be partially hydrogenated. Hydrogenation may be effected selectively as disclosed in U.S. Pat. Reissue 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers will have different diene blocks and these diene blocks may be selectively hydrogenated as described in U.S. Pat. No. 5,229,464 which is also herein incorporated by reference.

U.S. Pat. Nos. 5,478,885 and 5,461,112 describe anhydride curing agents as commonly used to cure the epoxidized diene polymers described above. Anhydrides are used herein because a bake cure system is desired. Amine curing agents, which work well in compositions containing epoxy resins as described in said patent, will not cure epoxidized diene polymers. The anhydride curing agents described as useful in said patents may be any compound containing one or more anhydride functional groups and specific examples given include phthalic anhydride, substituted phthalic anhydrides, hydrophthalic anhydrides (which are not aromatic compounds because they are hydrogenated), substituted hydrophthalic anhydrides, succinic anhydride, substituted succinic anhydrides, halogenated anhydrides, multifunctional carboxylic acids, and polycarboxylic acids.

As stated, aromatic curing agents are necessary for use in the present invention. The preferred group of aromatic curing agents are those which are based on phthalic anhydride. Most preferably, the curing agents are alkyl substituted phthalic anhydrides wherein the alkyl substituents have from 1 to 18 carbon atoms, most highly preferred from 1 to 12 carbon atoms. These alkyl substituted phthalic anhydrides may be mono, di, or trisubstituted. The preferred aromatic carboxylic acid anhydride curing agents are phthalic anhydride and 4-methyl-phthalic anhydride, with the latter being the most preferred.

Because of their ease of handling, saturated or partially saturated anhydrides, such as hydrophthalic anhydrides and substituted hydrophthalic anhydrides, are regularly used in this type of curing. I have found that, unknown to those skilled in the art, these anhydrides cause problems when used to cure epoxidized diene polymers by themselves (as opposed to in combination with epoxy resins as described in U.S. Pat. Nos. 5,478,885 and 5,461,112). Specifically, carbon dioxide generated during the reaction of the epoxidized polymer and the curing agent creates bubbles in the cured product and causes the product to have diminished physical properties.

I have found that it is necessary to use an anhydride curing agent which is aromatic in nature to achieve a good bake cure without the formation of bubbles in the product. Carbon dioxide is not generated in the reaction of an epoxidized diene polymer and an aromatic anhydride curing agent. According to my invention, the aromatic anhydride is combined with the epoxidized diene polymer such that a suitable epoxy/anhydride molar ratio is achieved. This ratio should range from 0.5/1.0 to 2.0/1.0, preferably 0.8/1.0 to 1.2/1.0, and most preferably about 1/1, to achieve sufficient crosslinking to produce a product with desirable physical properties. The crosslinking occurs through the epoxy groups and aromatic anhydride such that aromatic ester linkages are formed. Typically, the aromatic anhydride cures are conducted at elevated temperatures—temperatures of from 100° to 200° C. are possible but 130° to 180° C. is the preferred operating range —for a period of 10 minutes to 6 hours, and are often referred to as "bake cures."

The anhydride bake cures can be accelerated by using a curing accelerator and accelerators are highly recommended for practical operation. Suitable curing accelerators include trialkyl amines, hydroxyl-containing compounds and imidazoles. Benzyldimethylamine (BDMA), 2-ethyl-4-methylimidazole (EMI), triphenylphosphine (TPP), and $BF_3$ amine complexes have been found to work well in curing the blends of the present invention. The accelerator is used in an amount of 0.1 to 10, preferably about 1 part of accelerator per 100 parts of polymer.

The crosslinked materials of the present invention are useful in adhesives (including pressure sensitive adhesives, contact adhesives, laminating adhesives, assembly adhesives and structural adhesives), sealants, coatings, films (such as those requiring heat and solvent resistance), etc. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention and the aromatic anhydride curing agent. This is especially true for coatings, sealants, and structural adhesives. However, in applications such as pressure sensitive adhesives, suitable formulations would also contain various combinations of resins, plasticizers, fillers, solvents, stabilizers and other ingredients such as asphalt. The following are some typical examples of formulating ingredients for adhesives, coatings and sealants.

In adhesive applications, as well as in coatings and sealants, it may be necessary to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Resins may also be employed as reinforcing agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins. Examples of such reinforcing resins useful in the present invention are the hydrogenated Regalrez® and Regalite® resins from Hercules. Preferably, they are used in amounts from 1 to 50 percent by weight of the total composition.

Other resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from 0 to 400 parts by weight per hundred parts rubber (phr), preferably between 20 to 350 phr, most preferably 20 to 150 phr. The selection of the particular tackifying agent is, in large part, dependent upon the specific polymer employed in the respective adhesive composition.

Reactive co-curing components such as epoxy resins and epoxidized natural products are also useful as reinforcing agents. Examples of useful epoxy resins are aromatic resins such as EPON® 828 resin from Shell and aliphatic resins such as EPONEX® 1510 resin from Shell and UVR 6110 resin from Union Carbide. Examples of useful epoxidized or epoxy-containing natural products are the DRAPEX® series of epoxidized oils from Witco and naturally occurring vernonia oil.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils. e.g. Tufflo® 6056 and 6204 oil made by Arco and process oils, e.g. Shellflex® 371 oil made by Shell. Reactive compounds can be used as plasticizers. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition. Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

Various types of fillers and pigments can be included in the formulation. This is especially true for exterior coatings or sealants in which fillers are added not only to create the desired appeal but also to improve the performance of the coatings or sealants such as its weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

All adhesive, coating and sealant compositions based on the epoxidized polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive, coating or sealant application.

The only two ingredients that will always be used in any adhesive, coating or sealant are the epoxidized polymer and the curing agent. Beyond these two ingredients, the formulator will choose to use or not to use among the various resins, fillers and pigments, plasticizers, reactive oligomers, reactive and non-reactive diluents, stabilizers, and solvents.

Adhesives are frequently thin layers of sticky compositions which are used in protected environments (adhering two substrates together). Therefore, unhydrogenated epoxidized polymers will usually have adequate stability so resin type and concentration will be selected for maximum stickiness without great concern for stability, and pigments will usually not be used.

Coatings are frequently thin, non-sticky, pigmented compositions applied on a substrate to protect or decorate it. Therefore, hydrogenated epoxidized polymers may be needed to give adequate durability. Resins will be selected to assure maximum durability and minimum dirt pick-up. Fillers and pigment will be selected carefully to give appropriate durability and color. Coatings will frequently contain relatively high solvent concentration to allow easy application and give a smooth dry coating.

Sealants are gap fillers. Therefore, they are used in fairly thick layers to fill the space between two substrates. Since the two substrates frequently move relative to each other, sealants are usually low modulus compositions capable of withstanding this movement. Further, they generally have good adhesion to the substrates. Since sealants are frequently exposed to the weather, the hydrogenated epoxidized polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the epoxidized polymers of this invention to prepare adhesives, coatings and sealants having properties suitable for many different applications.

The adhesive, coating and sealant compositions of the present invention can be prepared by mixing the components together until a homogeneous blend is obtained. Various methods of blending are known to the art and any method that produces a homogenous blend is satisfactory. Frequently, the components can be blended together using solvent to control viscosity. Suitable solvents include common hydrocarbons, esters, ethers, ketones and alcohols as well as mixtures thereof. If solvent content is restricted or in solvent-free compositions, it may be possible to heat the components to help reduce viscosity during mixing and application.

A preferred use of the present formulation is in weatherable bake-cured sealants. The sealant comprises a monohydroxylated epoxidized diene polymer, an acid anhydride curing agent, an optional curing accelerator, an optional reinforcing resin or co-curing agent, and an optional tackifying resin. Alternatively, when the amount of tackifying resin is zero, the compositions of the present invention may be used for adhesives that do not tear paper and molded goods and the like.

Coating compositions of this invention can be used in many applications, depending on the hardness, adhesion, durability and cure conditions chosen by the formulator. A fairly soft coating formulated for low adhesion could be used as a protective strippable coating. A fairly soft coating formulated for high adhesion could be useful as a shatter retentive coating for glass bottles for carbonated beverages. A fairly hard coating formulated for high adhesion and long durability could be used as a corrosion protective coating for metals such as lawn equipment, automobiles, etc.

Sealant compositions of this invention can be used for many applications. Particularly preferred is their use as gap fillers for constructions which will be baked (for example, in a paint baking oven) after the sealant is applied. This would include their use in automobile manufacture and in appliance manufacture. Another preferred application is their use in gasketing materials, for example, in lids for food and beverage containers.

EXAMPLE 1

A series of experiments were carried out using a variety of anhydrides to cure a monohydroxylated epoxidized polydiene block copolymer having the structure I-B-OH where I is a block of polymerized isoprene of weight average molecular weight 1000. B is a block of polymerized butadiene of weight average molecular weight 5000 and —OH is a terminal hydroxyl group. The polymer was partially hydrogenated and then fully epoxidized to yield an epoxy content of 1.5 meq/g. Nonaromatic anhydrides—methyl tetrahydrophthalic anhydride (MTHPA), hexahydrophthalicanhydride(HHPA), methyl-5 norbornene-2,3-dicarboxylicanhydride (Nadic methyl anhydride, NMA), and dodecenyl anhydride (DSA)—were compared with aromatic anhydrides—phthalic anhydride(PA), 4-methyl-phthalic anhydride (MPA), and 4-t-butylphthalic anhydride (tBPA). The amount of curing agent used in each experiment was chosen to give a 1:1 molar ratio of epoxy to anhydride functionality. The accelerator, 2-ethyl-4-methyl imidazole (EMI) was used in an amount of one part per hundred parts of polymer. The formulation components were mixed and then placed in 1/16 inch glass molds.

The composition was cured at 150° C. for two hours. Table I shows some of the physical properties of the cured compositions and also the reaction exotherm for each of the reactions. The reaction exotherm is a measure of the amount of reaction, i.e. crosslinking, which took place during the curing process and is measured calorimetrically. The maximum stress and elongation at maximum stress are derived from tensile deformation experiments.

TABLE I

| anhydride | melting point (°C.) | max. stress (psi) | elongation at max. stress (%) | rxn exotherm (kJ/mole epoxy) |
|---|---|---|---|---|
| MTHPA | liquid at room temperature | 187 | 283 | −20.6 |
| HHPA | 37 | 173 | 402 | −18.9 |
| DSA | 43 | 50 | 154 | −19.9 |
| NMA | liquid at room temperature | 6 | 1600 | −9.1 |
| PA | 135 | 944 | 146 | −47.0 |
| MPA | 94 | 508 | 165 | −57.6 |
| tBPA | 78 | — | — | −8.8 |

As can be seen from the reaction exotherms, the aromatic anhydrides led to a higher degree of conversion than the others. This increased level of crosslinking is also reflected in the mechanical properties of the cured polymer. The tensile strengths are significantly higher for the PA and MPA systems. Thus, the aromatic anhydrides lead not only to a bubble-free sample but also to a higher level of crosslinking in the polymer. This may be somewhat attributed to the lack of decarboxylation as that side reaction would yield unreactive anhydride and a necessarily lower conversion. However, another feature observed is the steric character of the anhydrides. The tri-substituted epoxy of this polymer is a relatively crowded reaction site. Therefore, bulky anhydrides like NMA and DSA may be unable to easily accommodate the steric requirements for reaction. PA and MPA are both flat molecules and as such may more easily approach the reaction site. The relative acid strengths may also play a role in extent of reaction. TBPA did not lead to carbon dioxide bubble formation. However, the extent of reaction was low. This is attributable to the relatively bulky nature of this curing agent.

Both PA and MPA lead to superior physical properties. The lower melting point of MPA may present a processing advantage, though. In our laboratory experience we have found that the PA system must be heated to 150° C. to thoroughly melt and mix the anhydride. At this elevated temperature, gel formation proceeds rapidly upon addition of the catalyst. With the MPA system, the anhydride is easily melted and mixed at 120° C. Addition of catalyst at this temperature does not lead to rapid gelation. Rheological experiments show that the gel time for the polymer/MPA/EMI system is near 1800 seconds at 120° C.

Because of the avoidance of the adverse decarboxylation reaction, superior mechanical properties, ease of processing, and commercial availability, MPA has been identified by this screening study to be the anhydride curing agent of choice for this polymer.

EXAMPLE 2

This example demonstrates the use of the epoxidized monohydroxylated polymer of Example 1 with a variety of accelerating agents. The sealants of this example were formulated with a stoichiometric ratio of epoxy to anhydride where the anhydride was MPA. An accelerator was used at the 1 phr level. The formulations were mixed and then cured in 1/16 inch glass molds at 160° C. for 2 hours. Table II lists the tensile property results. All formulations cured without the formation of carbon dioxide bubbles. These results show that BDMA is an effective accelerant for MPA cures of epoxidized polydiene polymers.

TABLE II

| Accelerator | Strength (psi) | Elongation (%) |
|---|---|---|
| BDMA | 231 | 320 |
| TPP | 51 | 630 |
| None | 159 | 430 |

EXAMPLE 3

This example demonstrates the use of the epoxidized monohydroxylated polymer of Example 1 with reinforcing additives in MPA cures. The molar ratio of epoxy to anhydride functionality was maintained at 1:1 in all cases. This required consideration of the epoxy level of the additives. EMI was used at 1 part per 100 parts polymer to accelerate the cure. The cures were conducted in glass molds as in Example 1. The physical properties of the resulting bake-cured sealants are shown in Table III. No carbon dioxide was evolved during the cure of these sealants with the aromatic anhydride. Bubble-free test specimens with high strength were obtained. The data demonstrate that both hydrogenated hydrocarbon resins of elevated Tg and epoxidized oils are effective at providing aromatic anhydride cured sealants of elevated Tg.

TABLE III

| reinforcing additive | description | EEW (g/mole) | amount basis polymer mass (%) | mixing temp (°C.) | compat. (Y/N) | Tg (°C.) | strength (psi) | elongation (%) | cure condition (°C./hours) |
|---|---|---|---|---|---|---|---|---|---|
| Drapex 6.8 | epoxidized soybean oil | 229 | 10 | 130 | Y | 44 | 2560 | 185 | 170/2 |
| | | | 25 | 130 | Y | 57 | 2680 | 74 | 170/2 |
| | | | 50 | 130 | Y | 30–95 | 2390 | 13 | 170/2 |
| Regalite R125 | hydrogenated hydrocarbon polymer | 0 | 25 | 160 | Y | 56 | 1520 | 120 | 160/2 |
| Regalite R125 | hydrogenated hydrocarbon polymer | 0 | 50 | 160 | Y | 53 | 1030 | 100 | 160/2 |
| None | control | — | 0 | 130 | — | 36 | 1360 | 290 | 170/2 |

I claim:

1. A process for curing epoxidized diene polymers for use in adhesives, sealants, and coatings which consists of contacting the polymer with an aromatic anhydride curing agent selected from the group consisting of phthalic anhydride and methylphthalic anhydride at an epoxy/anhydride molar ratio from 0.5/1 to 2.0/1.0, and optionally, from 0.1 to 10 phr of an accelerator at a temperature of from 100° to 200° C. for a period of 10 minutes to six hours.

2. The process of claim 1 where the structure of the epoxidized polydiene is $(HO)_x$-A-$S_z$-B-$(OH)_y$ wherein A and B are polymer blocks which are homopolymer blocks of conjugated diolefin monomers, copolymer blocks of conjugated diolefin monomers, or copolymer blocks of diolefin monomers and monoalkenyl aromatic hydrocarbon monomers, and wherein S is a vinyl aromatic hydrocarbon block, and wherein x and y are 0 or 1 and either x or y must be 1 but only one at a time can be 1, and wherein z is 0 or 1, and wherein the epoxidation is contained within one or more of the diene blocks.

3. The process of claim 2 where x=0, y=1, z=0, and block B is comprised of styrene and butadiene and block A is comprised of isoprene.

4. The process of claim 1 wherein the epoxidized diene polymer contains from 0.1 to 7.0 meq/g of epoxy per gram of polymer.

5. The process of claim 1 wherein the accelerator is selected from the group consisting of 2-ethyl-4-methyl-imidazole and benzyl-dimethyl-amine.

6. The process of claim 1 wherein the temperature ranges from 130° C. to 160° C.

* * * * *